United States Patent
Maziers et al.

(10) Patent No.: US 7,193,025 B2
(45) Date of Patent: Mar. 20, 2007

(54) METALLOCENE POLYPROPYLENE FOR ROTOMOULDING

(75) Inventors: Eric Maziers, Seneffe (BE); Valérie Smits, Lobbes (BE)

(73) Assignee: Total Petrochemicals Research Feluy, Feluy (BE)

( * ) Notice: Subject to any disclaimer, the term of this patent is extended or adjusted under 35 U.S.C. 154(b) by 10 days.

(21) Appl. No.: 10/512,389

(22) PCT Filed: Apr. 22, 2003

(86) PCT No.: PCT/EP03/04234

§ 371 (c)(1),
(2), (4) Date: Jul. 15, 2005

(87) PCT Pub. No.: WO03/091295

PCT Pub. Date: Nov. 6, 2003

(65) Prior Publication Data

US 2005/0288472 A1    Dec. 29, 2005

(30) Foreign Application Priority Data

Apr. 26, 2002  (EP) ................... 02076659
Feb. 25, 2003  (EP) ................... 03075558
Feb. 25, 2003  (EP) ................... 03075559

(51) Int. Cl.
C08F 110/06  (2006.01)
C08F 4/42    (2006.01)

(52) U.S. Cl. .................. 526/351; 526/348.1; 526/160; 526/943

(58) Field of Classification Search ............... 526/351, 526/160, 943, 348.1
See application file for complete search history.

(56) References Cited

U.S. PATENT DOCUMENTS

| 5,457,159 | A |   | 10/1995 | Fassina et al. |
| 5,888,636 | A | * | 3/1999  | Asanuma et al. ........... 428/213 |
| 6,124,400 | A |   | 9/2000  | Chien |
| 6,770,714 | B2|   | 8/2004  | Ommundsen et al. |

FOREIGN PATENT DOCUMENTS

EP    0 780 431 A1    6/1997

* cited by examiner

*Primary Examiner*—Ling-Sui Choi
(74) *Attorney, Agent, or Firm*—William D. Jackson; Tenley R. Krueger

(57) ABSTRACT

The present invention is concerned with single layer articles produced by rotomoulding and consisting essentially of metallocene-produced syndiotactic polypropylene or isotactic random copolymer of propylene.

17 Claims, 2 Drawing Sheets

5  Metallocene-produced
Syndiotactic polypropylene

Polyethylene (Ziegler-Natta)

10

METALLOCENE POLYPROPYLENE FOR ROTOMOULDING

The present invention is concerned with rotomoulded articles prepared with syndiotactic polypropylene or with isotactic random copolymers of propylene and having a high contact transparency and a high impact resistance at room temperature.

Rotomoulding is used for the manufacture of simple to complex, hollow plastic products. It can be used to mould a variety of materials such as polyethylene, polypropylene, polycarbonate or PVC. Linear low density polyethylene is preferably used.

These materials however suffer from high shrinkage and warping and for some applications, from their whiteness in their natural state.

Plastoelastomeric compositions such as described in U.S. Pat. No. 5,457,159 can also be used in rotomoulding, but they require complex processing steps of mixing and vulcanisation.

U.S. Pat. No. 6,124,400 discloses the use for rotomoulding of polymer alloys containing semi-crystalline polyolefin sequences with chains of different controlled microstructure prepared in a "one-pot" polymerisation process from a single monomer. The polymerization of these polymer alloys requires a complex catalyst system comprising organometallic catalyst precursors, cationic forming cocatalysts and cross-over agents.

There is thus a need for rotomoulded articles that do not suffer from these drawbacks.

It is an aim of the present invention to prepare rotomoulded articles with low shrinkage.

It is a further aim of the present invention to prepare rotomoulded articles having good contact transparency.

It is also an aim of the present invention to produce rotomoulded articles with very little warping.

It is another aim of the present invention to prepare rotomoulded articles having good impact strength and ease of processing.

It is yet a further aim of the present invention to prepare rotomoulded articles that resist gamma irradiation.

Figure 1:
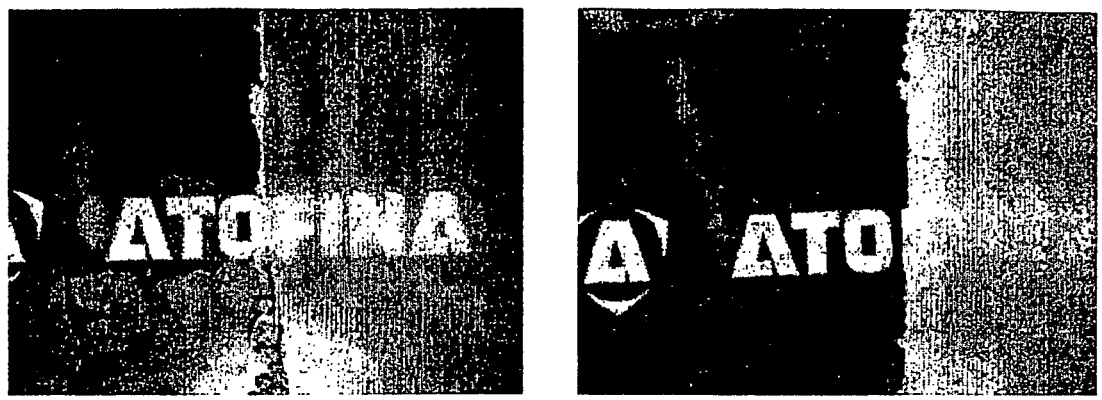
FIG. 1 illustrates the contact transparency of a sample.

Accordingly, the present invention discloses single layer articles produced by rotomoulding and consisting essentially of metallocene-produced syndiotactic polypropylene or isotactic random copolymer of propylene.

The metallocene-produced polypropylene used in the present invention has a melt index of from 3 to 40 g/10 min and preferably of from 10 to 20 g/10 min.

The melt index MI2 is measured using the procedures of standard test ASTM D 1238 at 190° C. for polyethylene resins and at 230° C. for polypropylene resins and under a load of 2.16 kg.

The metallocene component used to prepare the syndiotactic polypropylene can be any bridged metallocene known in the art, represented by the general formula:

$$R''_s(CpR'_k)(Flu)MQ_2 \qquad \text{I.}$$

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$–$C_6$ ring, wherein Flu is a flureny, substituted or unsubstituted and wherein the substituents on the Cp and on the Flu are selected to impart Cs symmetry to the compound; R'' is a structural bridge between the Cp and the Flu rings to impart stereorigidity that can be a $C_1$–$C_4$ alkylene radical, a dialkyl germanium or silicon or siloxane, or a alkyl phosphine or amine radical; Q is a hydrocarbyl radical such as aryl, alkyl, alkenyl, alkylaryl, or aryl alkyl radical having from 1–20 carbon atoms, hydrocarboxy radical having 1–20 carbon atoms or halogen and can be the same or different from each other, and M is a metal Group IVb of the Periodic Table. Preferred metals are Zr, Ti, Hf.

Among the preferred metallocenes used in the present invention, one can cite among others 1,1-diphenyl-1-cyclopentadienyl-1-(-3,6-di-tert-butyl-fluorenyl)-methane-zirconium dichloride or isopropyl-(cyclopentadienyl-fluorenyl) zirconium dichloride for the production of syndiotactic polypropylene.

The metallocene component used to prepare the isotactic random copolymer of propylene can be any bridged metallocene known in the art, represented by the general formula:

$$R''_s(CpR'_k)(C'pR'''_k)MQ_2 \qquad \text{II.}$$

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$–$C_6$ ring, wherein $(C'pR'''_k)$ is a cyclopentadienyl, or an indenyl or a flureny, substituted or unsubstituted and wherein the substituents on the Cp rings are selected to impart C1 or C2 symmetry to the compound; R'' is a structural bridge between the Cp and the Flu rings to impart stereorigidity that can be a $C_1$–$C_4$ alkylene radical, a dialkyl germanium or silicon or siloxane, or a alkyl phosphine or amine radical; Q is a hydrocarbyl radical such as aryl, alkyl, alkenyl, alkylaryl, or aryl alkyl radical having from 1–20 carbon atoms, hydrocarboxy radical having 1–20 carbon atoms or halogen and can be the same or different from each other, and M is a metal Group IVb of the Periodic Table. Preferred metals are Zr, Ti, Hf.

Among the preferred metallocenes used in the present invention, one can cite among others isopropylidene-(3-tert-butyl-5-methyl-cyclopentadienyl)(fluorenyl) zirconium dichloride for the production of isotactic random copolymer of propylene.

The metallocene may be supported according to any method known in the art. In the event it is supported, the support used in the present invention can be any organic or inorganic solids, particularly porous supports such as talc, inorganic oxides, and resinous support material such as polyolefin. Preferably, the support material is an inorganic oxide in its finely divided form.

The addition on the support, of an agent that reacts with the support and has an ionising action, creates an active site.

Preferably, alumoxane is used to ionize the catalyst during the polymerization procedure, and any alumoxane known in the art is suitable.

The preferred alumoxanes comprise oligomeric linear and/or cyclic alkyl alumoxanes represented by the formula:

for oligomeric, linear alumoxanes and

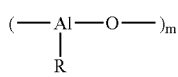

for oligomeric, cyclic alumoxanes, wherein n is 1–40, preferably 10–20, m is 3–40, preferably 3–20 and R is a $C_1$–$C_8$ alkyl group and preferably methyl.

Methylalumoxane is preferably used.

One or more aluminiumalkyl(s) can be used as cocatalyst in the reactor. The aluminiumalkyl is represented by the formula $AlR_X$ can be used wherein each R is the same or different and is selected from halides or from alkoxy or alkyl groups having from 1 to 12 carbon atoms and x is from 1 to 3. Especially suitable aluminiumalkyl are trialkylaluminium, the most preferred being triisobutylaluminium (TIBAL).

Further, the catalyst may be prepolymerised prior to introducing it in the reaction zone and/or prior to the stabilization of the reaction conditions in the reactor.

The polymerisation of the metallocene-produced polypropylene can be carried out in gas, solution, bulk or slurry phase. The polymerisation temperature ranges from 20 to 125° C., preferably from 60 to 95° C. and the pressure ranges from 0.1 to 5.6 Mpa, preferably from 2 to 4 Mpa, for a time ranging from 10 minutes to 4 hours, preferably from 1 and 2.5 hours.

The average molecular weight is controlled by adding hydrogen during polymerisation. The relative amounts of hydrogen and olefin introduced into the polymerisation reactor are from 0.001 to 15 mole percent hydrogen and from 99.999 to 85 mole percent olefin based on total hydrogen and olefin present, preferably from 0.2 to 3 mole percent hydrogen and from 99.8 to 97 mole percent olefin.

The rotomoulding machine can be any one of the machines generally used in the field such as for example the CACCIA 1400R rotational moulding machine.

The rotomoulded articles prepared with syndiotactic polypropylene according to the present invention are characterised by an excellent contact transparency. They also exhibit very low shrinkage and warping. They have excellent flexural yield strength and flexural properties. In addition, they offer a good resistance to γ irradiation. They further have the good sealing ability of sPP resins while maintaining good impact strength at room temperature. Additionally, the production cycling time of the sPP resins is comparable to that of polyethylene resins currently used in rotomoulding.

The rotomoulded isotactic random copolymer polypropylene articles according to the present invention are characterized by an excellent contact transparency. They also exhibit very low shrinkage and warpage. In addition, they have excellent flexural yield strength and flexural properties. They further have the good sealing ability of metallocene random polypropylene.

The production cycle time of the metallocene-based random polypropylene resins is comparable to that of polyethylene resins currently used in rotomoulding, thereby allowing parallel processing with polyethylene articles.

The impact strength is measured at room temperature and following the method of standard test ASTM 30-29.

Flexural yield strength and flexural modulus are measured following the method of standard test ASTM D-790 M.

The metallocene-produced sPP or isotactic random copolymer of propylene can be used to produce rotomoulded articles in a variety of applications such as for example tanks, containers, toys, boats, furniture, medical applications.

Additionally, the metallocene-produced syndiotactic polypropylene or isotactic random copolymer of propylene can be extruded to prepare micropellets having a controlled shape and dimensions ranging from 400 to 1500 microns. These micropellets can be directly used in various applications such as in injection moulding, rotomoumding, micromoulding, slush-moulding and coating.

EXAMPLES

Several metallocene-produced syndiotactc polypropylene or isotactic random copolymer of propylene resins have been tested and compared to a reference polyethylene in the rotomoulding industry.

Resins R1 and R2 are syndiotactic polypropylene resins prepared with a metallocene catalyst system comprising isopropyl (cyclopentadienyl) (fluorenyl) zirconium dichloride and following the method described in EP-351,392.

Resin R3 is a commercial polyethylene sold under the name Rigidex® 3560 UA by BP.

Resin R4 is an isotactic random copolymer of propylene prepared with a metallocene catalyst system comprising isopropylidene-(-3-tert-butyl-5-methyl-cyclopentadienyl) (fluorenyl)-zirconium dichloride. Resin R4 additionally contained 2000 ppm of a clarifying agent, Millad 3988. The addition of a clarifying agent is not necessary to obtain the good contact transparency and the good processability.

The properties of these three resins are summarised in Table I.

TABLE I

| Resin | R1 | R2 | R3 | R4 |
|---|---|---|---|---|
| Density g/cm³ ASTM D-1505 | n.a. | n.a. | 0.9375 | n.a. |
| MI2 g/10 min (190° C.) | n.a. | n.a; | 8 | n.a. |
| MI2 g/10 min (230° C.) | 10 | 20 | n.a. | 7 | n.a. means not applicable

All test mouldings were carried out on the CACCIA 1400R rotational moulding machine having the following specifications:
Shuttle-style machine
Offset arm
LPG burner arm
Burner capacity of 7700 Kcal/hr
Air fan cooling
Maximum plate diameter of 950 mm.

The mould used to produce the test mouldings was an aluminium box mould of base 300 mm×300 mm with a draft angle of 3° included to facilitate demoulding. To enable shrinkage analysis, the hypothenuse distance of the grid at the bottom of the mould was measured to be 169.9 mm.

The samples for resins R1, R2 and R3 were prepared under the same processing conditions and reached approximately the same peak internal air temperature (PIAT) of 200° C. Resin R1 was also prepared under processing conditions such that the PIAT reached approximately the temperature of 220° C. The cycle times for the 3 resins are displayed in Table II. Additionally, data are provided for resin R1 with a peak internal air temperature of 220° C.

Resin R4 was prepared using processing conditions such that the PIAT reached approximately 220° C. The cycle time for resin R4 is also displayed in Table II.

Shrinkage and warpage were measured on these samples as described below.

Mould shrinkage factors are measured by recording how much a moulded article dimension reduces after the moulding has cooled. The reduced dimension is related to a reference dimension taken from the actual mould. In the case of the box mould used in the present invention, the mould had a grid machined into the bottom of its cavity. The distance selected as the reference value was the hypothenuse distance of the grid at the bottom of the mould: it was measured to be 169.9 mm. The distance between the same two reference points was recorded on the cooled moulding and the percentage of shrinkage was then determined. The measuring apparatus consisted of a milling machine bed upon which the moulded article was placed. An electronic microscope was fixed onto movable axes positioned above the milling bed. Any movements of the axes, and subsequently of the microscope, were measured on an electronic meter so that the X and Y coordinates of movement could be obtained. Once the moulded article was positioned properly on the milling bed, the X and Y distances of the grid reproduced on the moulding could be measured and the diagonal distance between the selected grid points could be calculated and compared to the reference value of 169.9 mm, thereby allowing to calculate the percentage of shrinkage.

The amount of warpage on a moulded article was measured by using a dial gauge in conjunction with the apparatus described here-above for measuring the shrinkage.

The dial gauge pointer was placed above the centre of the grid and the milling machine bed was raised vertically so that a datum value could be set on the gauge. The milling bed was then moved so that the dial gauge sat on a point of the grid and a reading was made of how much the pointer rose or fell with respect to the datum value. This was repeated for all the points on the grid and the maximum warpage was defined as the largest deviation from the datum.

The results are also displayed in Table I.

TABLE II

| Material | PIAT ° C. | Cycle time (s) | Shrink factor (%) | Warpage (mm) |
| --- | --- | --- | --- | --- |
| R1 | 200 | 35.85 | 1.45 | 1.89 |
| R1 | 220 | 34.27 | 1.8 | 0.58 |
| R2 | 200 | 34.71 | 1.30 | 1.52 |
| R3 | 200 | 35.51 | 2.33 | 2.19 |
| R4 | 220 | 36.33 | 2.36 | 0.61 |

Impact measurements were carried out at room temperature for the average peak impact energy. The impact measurements were executed following the method of standard test ASTM 30-29. The results are displayed in Table III.

Flexural properties, represented by the flexural yield strength and the flexural modulus have been measured following respectively the methods of standard tests ASTM D-790 M. The results are also displayed in Table III.

TABLE III

| Material | Impact (J/mm) | Yield stress (Mpa) | Fl. Modulus (Mpa) |
| --- | --- | --- | --- |
| R1 | 5.87 | 13.3 | 380 |
| R2 | 4.25 | 13.6 | 353 |
| R3 | 7.93 | 12.4 | 588 |
| R4 | 1.00 | 15.2 | 618 |

Transmittance has been measured following the method of ASTM D 1003-00 for samples having a thickness of about 3 mm. The roto-moulded parts prepared with the syndiotactic polypropylene according to the present invention had a very high contact transparency as compared to those prepared with the reference polyethylene that all had a whitish appearance. This can be seen in FIG. 1 showing the contact transparency of a sample prepared with metallocene-produced syndiotactic polypropylene and of a sample prepared with a Ziegler-Nafta-produced polyethylene. The contact transparency results obtained for isotactic random copolymer of propylene are similar to those obtained with syndiotactic polypropylene. Transmittance results are summarised in Table IV.

TABLE IV

| Material | Transmittance (%) | Thickness (mm) |
| --- | --- | --- |
| R1 | 70.3 | 3.39 |
| R2 | 72.2 | 3.43 |
| R3 | 51.7 | 3.34 |
| R4 | 72.6 | 3.56 |

It is observed that the transmittance values of the roto-moulded parts prepared with syndiotactic polypropylene or isotactic random copolymer of propylene are much higher than those obtained with the reference polyethylene. The transparency is further improved by optimising the grinding process conditions in order to avoid unmelted material and bubbles. This is achieved for example by increasing the oven temperature or by pressurising the mould.

It can be concluded that both the metallocene-produced syndiotactic polypropylene and isotactic random copolymer of propylene have excellent transparency, very low level of shrinkage and warpage, excellent flexural yield strength and flexural properties, good sealing ability standard impact strength and production cycles comparable to that of polyethylene resins.

The fusion temperature of metallocene-produced polypropylene is lower than that of conventional polypropylene (Ziegler-Natta), resulting in excellent moulding capability. In addition the cycle time for the resins according to the present invention is comparable to that of polyethylene resins: these two types of resins can thus be moulded simultaneously.

Figure 2:
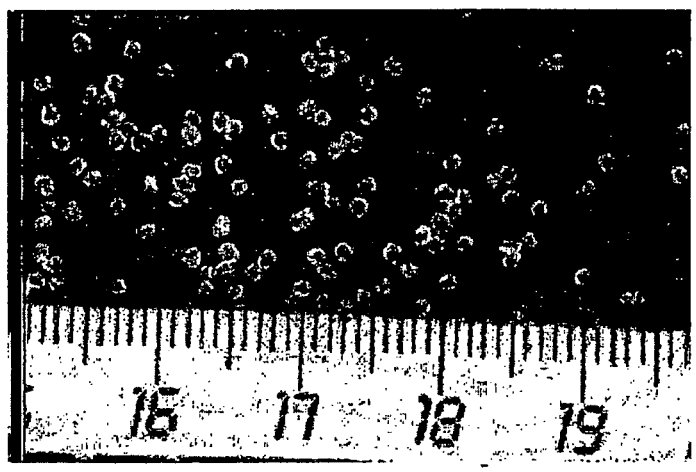
FIG. 2 illustrates the controlled shape of micropellets.
Figure 3:
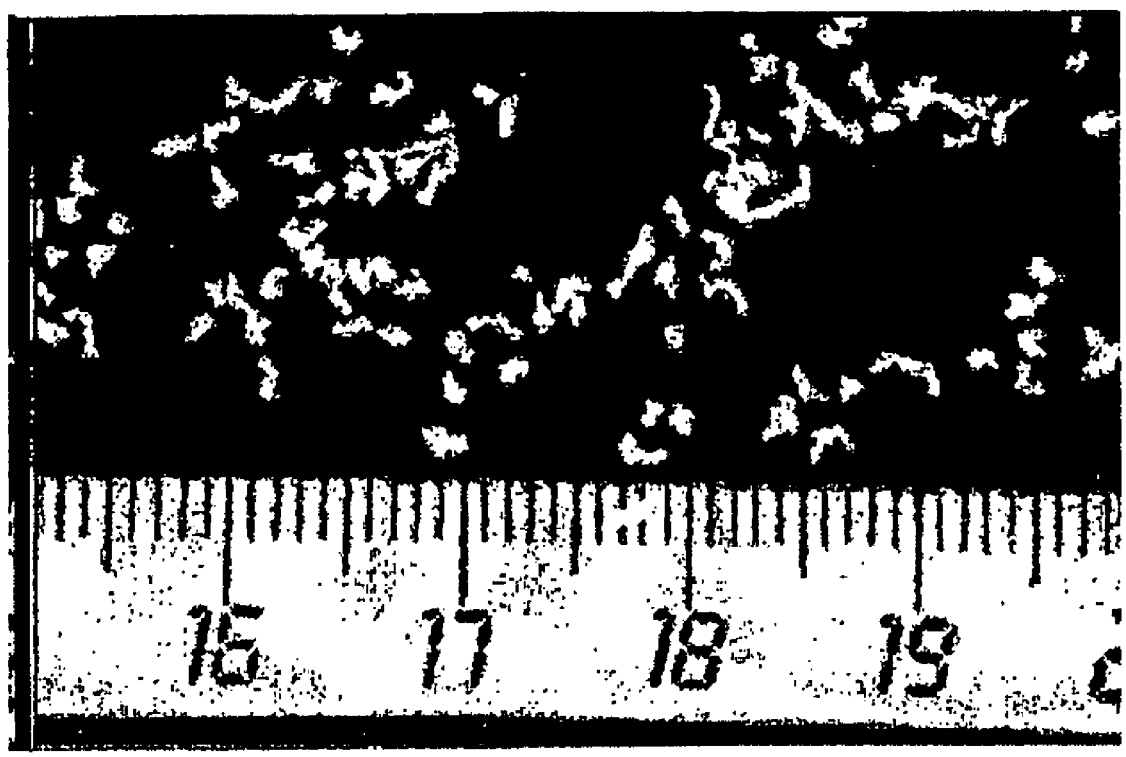
FIG. 3 illustrates comparison micropellets.

Resin R4 was successfully extruded to produce micropellets of controlled shape having an average size of 1 mm as can be seen on FIG. 2. For comparison, FIG. 3 shows the "micropellets" obtained with commercial resin R3.

The invention claimed is:

1. A single layer article produced by rotational molding of a polymer selected from the group consisting of syndiotactic polypropylene produced by the polymerization of propylene in the presence of a metallocene catalyst and an isotactic random copolymer produced by the polymerization of propylene and a comonomer in the presence of a metallocene catalyst to produce an isotactic random copolymer of propylene and said comonomer, wherein the article consists essentially of a single layer of said syndiotactic polypropylene or said isotactic random copolymer of propylene and said comonomer.

2. The article of claim 1 wherein said polymer has a melt flow index (MI2) within the range of 3–40 g/10 min.

3. The article of claim 2 wherein said polymer has a melt flow index (MI2) within the range of 10–20 g/10 min.

4. The article of claim 1 wherein said single layer has a transmittance of more than 60%.

5. The article of claim 1 wherein said layer exhibits a shrink factor of less than 2%.

6. The article of claim 1 wherein said layer has a shrink factor of less than 2%.

7. The article of claim 1 wherein said layer lias an impact strength of at least 4 j/mm.

8. The article of claim 1 wherein said single layer exhibits a flexural yield strength of at least 12.5 Mpa.

9. The article of claim 1 wherein said single layer exhibits a maximum warpage of less than 2 mm.

10. The article of claim 1 wherein said polymer is an isotactic random copolymer.

11. The article of claim 10 wherein said isotactic random copolymer is an ethylene-propylene copolymer.

12. The article of claim 1 wherein said polymer is syndiotactic polypropylene.

13. The article of claim 12 wherein said single layer has a transmittance of more than 60%.

14. The article of claim 12 wherein said layer exhibits a shrink factor of less than 2%.

15. The article of claim 12 wherein said layer has a shrink factor of less than 2%.

16. The article of claim 12 wherein said layer has an impact strength of at least 4 j/mm.

17. The article of claim 12 wherein said single layer exhibits a flexural yield strength of at least 12.5 Mpa.

* * * * *